United States Patent
Alamouti et al.

(10) Patent No.: US 8,149,178 B2
(45) Date of Patent: Apr. 3, 2012

(54) MILLIMETER-WAVE COMMUNICATION SYSTEM WITH DIRECTIONAL ANTENNA AND ONE OR MORE MILLIMETER-WAVE REFLECTORS

(75) Inventors: Siavash M. Alamouti, Hillsboro, OR (US); Alexander Alexandrovich Maltsev, Nizhny Novgorod (RU); Vadim Sergeyevich Sergeyev, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 12/301,556

(22) PCT Filed: May 23, 2006

(86) PCT No.: PCT/RU2006/000257
§ 371 (c)(1),
(2), (4) Date: May 13, 2009

(87) PCT Pub. No.: WO2007/136290
PCT Pub. Date: Nov. 29, 2007

(65) Prior Publication Data
US 2010/0033390 A1 Feb. 11, 2010

(51) Int. Cl.
*H01Q 19/10* (2006.01)
(52) U.S. Cl. ......... 343/837; 343/755; 343/836; 342/367
(58) Field of Classification Search .......... 343/775–779, 343/781 R, 836, 837, 878, 909; 342/367, 342/188, 361; 455/91, 500
See application file for complete search history.

(56) References Cited

U.S. PATENT DOCUMENTS

| 3,922,682 A | 11/1975 | Hyde |
| 4,224,626 A | 9/1980 | Sternberg |
| 4,321,604 A | 3/1982 | Ajioka |
| 5,206,658 A | 4/1993 | Wokurka |
| 5,276,277 A | 1/1994 | Hightower et al. |
| 5,426,443 A | 6/1995 | Jenness, Jr. |
| 9,610,277 | 4/1996 | Hines |
| 5,697,063 A | 12/1997 | Kishigami et al. |
| 6,018,659 A | 1/2000 | Ayyagari et al. |
| 6,320,538 B1 | 11/2001 | Lalezari et al. |
| 6,463,090 B1 | 10/2002 | Dorfman |
| 7,085,595 B2 | 8/2006 | Kitchin |

(Continued)

FOREIGN PATENT DOCUMENTS

CN 1331895 A 1/2002

(Continued)

OTHER PUBLICATIONS

"U.S. Appl. No. 11/452,710, Response filed Jun. 1, 2011 to Final Office Action mailed Feb. 3, 2011 and Advisory Action mailed May 6, 2011", 13 pgs.

(Continued)

*Primary Examiner* — Lana N Le
*Assistant Examiner* — Golam Sorowar
(74) *Attorney, Agent, or Firm* — Schwegman, Lundberg & Woessner, P.A.; Gregory J. Gorrie

(57) ABSTRACT

Embodiments of millimeter-wave communication systems and methods for communicating using millimeter-waves are described. In some embodiments, a directional antenna (102) may direct millimeter-wave signals substantially in a horizontal plane (115), and one or more reflectors (104) may be positioned to reflect the millimeter-wave signals to user devices (108).

14 Claims, 8 Drawing Sheets

U.S. PATENT DOCUMENTS

| | | |
|---|---|---|
| 7,130,904 B2 | 10/2006 | Kitchin |
| 7,133,374 B2 | 11/2006 | Lo et al. |
| 7,190,324 B2 | 3/2007 | Henderson |
| 7,216,166 B2 | 5/2007 | Sugauchi et al. |
| 7,245,879 B2 | 7/2007 | Sadri et al. |
| 7,260,392 B2 | 8/2007 | Kitchin |
| 7,286,606 B2 | 10/2007 | Maltsev et al. |
| 7,324,605 B2 | 1/2008 | Maltsev et al. |
| 7,333,556 B2 | 2/2008 | Maltsev et al. |
| 7,336,716 B2 | 2/2008 | Maltsev et al. |
| 7,349,436 B2 | 3/2008 | Maltsev et al. |
| 7,352,696 B2 | 4/2008 | Stephens et al. |
| 7,366,471 B1 | 4/2008 | Kitchin |
| 7,948,428 B2 | 5/2011 | Lovberg et al. |
| 2001/0026246 A1 | 10/2001 | Burnside et al. |
| 2002/0154656 A1 | 10/2002 | Kitchin |
| 2003/0228857 A1 | 12/2003 | Maeki |
| 2004/0003059 A1 | 1/2004 | Kitchin |
| 2004/0024871 A1 | 2/2004 | Kitchin |
| 2004/0061645 A1* | 4/2004 | Seo et al. .................. 342/383 |
| 2004/0100981 A1 | 5/2004 | Kitchin |
| 2004/0114535 A1 | 6/2004 | Hoffmann et al. |
| 2004/0120301 A1* | 6/2004 | Kitchin .................. 370/345 |
| 2004/0120428 A1 | 6/2004 | Maltsev et al. |
| 2004/0127245 A1 | 7/2004 | Sadri et al. |
| 2004/0242275 A1 | 12/2004 | Corbett et al. |
| 2005/0031047 A1* | 2/2005 | Maltsev et al. .............. 375/260 |
| 2005/0032478 A1 | 2/2005 | Stephens et al. |
| 2005/0058057 A1 | 3/2005 | Maltsev et al. |
| 2005/0058095 A1 | 3/2005 | Sadri et al. |
| 2005/0058895 A1 | 3/2005 | Stephens et al. |
| 2005/0068900 A1 | 3/2005 | Stephens et al. |
| 2005/0135493 A1 | 6/2005 | Maltsev et al. |
| 2005/0140563 A1 | 6/2005 | Eom et al. |
| 2005/0141406 A1 | 6/2005 | Maltsev et al. |
| 2005/0141412 A1 | 6/2005 | Sadri et al. |
| 2005/0141657 A1 | 6/2005 | Maltsev et al. |
| 2005/0143125 A1* | 6/2005 | Maltsev et al. .............. 455/557 |
| 2005/0147076 A1 | 7/2005 | Sadowsky et al. |
| 2005/0152328 A1 | 7/2005 | Sadri et al. |
| 2005/0152466 A1 | 7/2005 | Maltsev et al. |
| 2005/0157638 A1 | 7/2005 | Maltsev et al. |
| 2005/0161753 A1 | 7/2005 | Huff et al. |
| 2005/0190800 A1 | 9/2005 | Maltsev et al. |
| 2005/0286544 A1 | 12/2005 | Kitchin et al. |
| 2005/0287978 A1 | 12/2005 | Maltsev et al. |
| 2006/0007898 A1 | 1/2006 | Maltsev et al. |
| 2006/0067426 A1 | 3/2006 | Maltsev et al. |
| 2006/0114816 A1 | 6/2006 | Maltsev et al. |
| 2007/0091988 A1 | 4/2007 | Sadri et al. |
| 2007/0097891 A1 | 5/2007 | Kitchin |
| 2007/0099668 A1 | 5/2007 | Sadri et al. |
| 2007/0099669 A1 | 5/2007 | Sadri et al. |
| 2007/0287384 A1* | 12/2007 | Sadri et al. .................. 455/63.4 |
| 2009/0219903 A1 | 9/2009 | Alamouti et al. |
| 2009/0315794 A1 | 12/2009 | Alamouti et al. |
| 2010/0156721 A1 | 6/2010 | Alamouti et al. |
| 2010/0231452 A1 | 9/2010 | Babakhani et al. |

FOREIGN PATENT DOCUMENTS

| | | |
|---|---|---|
| DE | 03840451 | 6/1990 |
| EP | 0212963 | 3/1987 |
| EP | 0212963 A2 | 3/1987 |
| EP | 0548876 A1 | 6/1993 |
| EP | 1077508 A2 | 2/2001 |
| EP | 1085599 A2 | 3/2001 |
| EP | 1650884 A1 | 4/2006 |
| FR | 2569906 | 3/1986 |
| JP | 61065605 | 4/1986 |
| JP | 06200584 | 7/1994 |
| JP | 08-084107 | 3/1996 |
| JP | 8-84107 A | 3/1996 |
| JP | 08321799 | 12/1996 |
| JP | 09051293 | 2/1997 |
| JP | 11055174 | 2/1999 |
| JP | 2000165959 | 6/2000 |
| JP | 2001308797 | 11/2001 |
| JP | 2002534022 | 10/2002 |
| JP | 2003124942 | 4/2003 |
| JP | 2005244362 | 9/2005 |
| KR | 20060029001 | 4/2006 |
| WO | WO-0038452 A1 | 1/2000 |
| WO | WO-0231908 A2 | 4/2002 |
| WO | WO-2004114546 A1 | 12/2004 |
| WO | WO-2005050776 A2 | 6/2005 |
| WO | WO-2005114785 A1 | 12/2005 |
| WO | WO-2007136289 A1 | 11/2007 |
| WO | WO-2007136290 A1 | 11/2007 |
| WO | WO-2007136292 A1 | 11/2007 |
| WO | WO-2007136293 A1 | 11/2007 |
| WO | WO-2007146733 A1 | 12/2007 |

OTHER PUBLICATIONS

"European Application Serial No. 06824430.0, Office Action mailed Apr. 28, 2011", 6 pgs.

"Japanese Application Serial No. 2009-510911, Response filed May 2, 2011 to Non Final Office Action mailed Feb. 1, 2011", with English translation, 9 pgs.

"U.S. Appl. No. 12/301,669, Preliminary Amendment filed Jan. 8, 2010", 3 pgs.

"U.S. Appl. No. 12/301,693, Preliminary Amendment filed Nov. 20, 2008", 3 pgs.

"U.S. Appl. No. 12/301,792, Preliminary Amendment filed Nov. 21, 2008", 3 pgs.

"Canadian Application Serial No. 200680054319.6, Office Action mailed Jun. 28, 2011", 14 pgs.

"Japanese Application No. 2009510911, Office Action mailed Jul. 5, 2011", 2 pgs.

"Japanese Application Serial No. 2009-515577, Office Action mailed May 31, 2011", 6 pgs.

"U.S. Appl. No. 11/452,710, Non-Final Office Action mailed Jun. 11, 2009", 22 pgs.

"U.S. Appl. No. 11/452,710, Response filed Sep. 11, 2009 to Non Final Office Action mailed Jun. 11, 2009", 16 pgs.

"European Application No. 06824417.7, Office Action mailed Aug. 14, 2009", 2 pgs.

"European Application No. 06824418.5, Office Action Mailed Jul. 29, 2009", 5 pgs.

Wu, Xidong, et al., "Design and characterization of single- and multiple-beam mm-wave circularly polarized substrate lens antennas for wireless communications", *IEEE Transactions on Microwave Theory and Techniques*, 49(3), (Mar. 2001), 431-441.

"U.S. Appl. No. 11/452,710, Non Final Office Action mailed Aug. 22, 2011", 21 pgs.

"U.S. Appl. No. 12/301,669, Non Final Office Action mailed Aug. 24, 2011", 8 pgs.

"U.S. Appl. No. 12/301,693, Non Final Office Action mailed Sep. 22, 2011", 10 pgs.

"Chinese Application Serial No. 200680054314.3, Office Action mailed Jul. 4, 2011", 5 pgs.

"Chinese Application Serial No. 200680054323.2, Response filed Sep. 26, 2011 to Office Action mailed Mar. 17, 2011", 22 pgs.

"European Application Serial No. 06824430.0, Response filed Aug. 30, 2011 to Non Final Office Action dated Apr. 28, 2011", 3 pgs.

"Japanese Application Serial No. 2009-515577, Response filed Aug. 31, 2011 to Non Final Office Action dated May 31, 2011", 8 pgs.

"European Application No. 06824430.0, Office Action mailed Aug. 24, 2009", 3 pgs.

"U.S. Appl. No. 11/452,710, Final Office Action mailed Dec. 11, 2009", 20 pgs.

"U.S. Appl. No. 11/452,710, Response filed Mar. 9, 2010 to Final Office Action mailed Dec. 11, 2009", 12 pgs.

"Chinese Application Serial No. 200680054323.2, Office Action mailed Mar. 17, 2011", with English translation, 11 pgs.

"European Application No. 06824418.5, Response filed Feb. 8, 2010 to Office Action mailed Jul. 29, 2009", 2 pgs.

"European Application Serial No. 06824430.0, Office Action mailed Apr. 15, 2010", 5 pgs.

"European Application Serial No. 06824430.0, Response filed Feb. 8, 2010 to Office Action mailed Jul. 29, 2009", 2 pgs.

"European Application Serial No. 06835789.6, Office Action mailed Aug. 17, 2009", 2 pgs.

"Japanese Application Serial No. 2009-510911, Office Action mailed Feb. 1, 2011", with English translation, 8 pgs.

Fernandes, J., et al., "Impact of Shaped Lens antennas on MBS Systems", *Personal, Indoor and Mobile Radio Communications*, 2(8), (Sep. 8, 1998), 744-748.

Ueda, T., et al., "An efficient MAC protocol with direction finding scheme in wireless ad hoc network using directional antenna", *IEEE Proceedings Radio and Wireless Conference*, 2003. RAWCON apos; 03., (2003), 233-236.

Ueda, Tetsuro, et al., "An Efficient MAC Protocol with Direction Finding Scheme in Wireless Ad Hoc Network using Directional Antenna", *Proceedings, Radio and Wireless Conference*, 2003., (Aug. 10-13, 2003), 4 pgs.

Wu, X., et al., "Design and Characterization of Single- and Multiple-Beam MM-Wave Circularly Polarized Substrate Lens Antennas for Wireless Communications", *IEEE Transactions on Microwave Theory and Techniques*, 49(3), (Mar. 2001), 2001-2003.

"U.S. Appl. No. 11/452,710, Response filed Nov. 22, 2011 to Non Final Office Action mailed Aug. 22, 2011", 15 pgs.

"Chinese Application Serial No. 200680054334.0, Office Action mailed Sep. 21, 2011", W/English Translation, 12 pgs.

"European Serial No. 06824417.7, Response filed Jan. 12, 2010 to Office Action mailed Aug. 14, 2009", 13 pgs.

"European Application Serial No. 06824430.0, Response filed Mar. 3, 2010 to Office Action mailed Aug. 24, 2009", 17 pg.

"European Application Serial No. 06835789.6, Response filed Feb. 8, 2010 to Office Action mailed Aug. 17, 2009", 36 pgs.

"International Application Serial No. PCT/RU2006/000256, International Preliminary Report on Patentability mailed Dec. 11, 2008" 8 pgs.

"International Application Serial No. PCT/RU2006/000256, International Search Report and Written Opinion mailed Feb. 27, 2007" 13 pgs.

"International Application Serial No. PCT/RU2006/000257, International Preliminary Report on Patentability mailed Dec. 11, 2008" 10 pgs.

"International Application Serial No. PCT/RU2006/000257, International Search Report and Written Opinion mailed Jun. 18, 2007", 17 pgs.

"International Application Serial No. PCT/RU2006/000257, Partial International Search Report mailed Mar. 12, 2007", 5 pgs.

"International Application Serial No. PCT/RU2006/000315, International Preliminary Report on Patentability mailed Dec. 11, 2008", 7 pgs.

"International Application Serial No. PCT/RU2006/000315, International Search Report and Written Opinion mailed Mar. 7, 2007", 13 pgs.

"International Application Serial No. PCT/RU2006/000316, International Preliminary Report on Patentability mailed Dec. 11, 2008", 9 pgs.

"International Application Serial No. PCT/RU2006/000316, International Search Report and Written Opinion mailed Mar. 21, 2007", 13 pgs.

"International Application Serial No. PCT/US2007/070588, International Search Report and Written Opinion mailed Oct. 25, 2007", 10 pgs.

* cited by examiner

MILLIMETER-WAVE COMMUNICATION SYSTEM

MULTI-SECTOR EMBODIMENTS

MILLIMETER-WAVE COMMUNICATION SYSTEM

MILLIMETER-WAVE COMMUNICATION SYSTEM

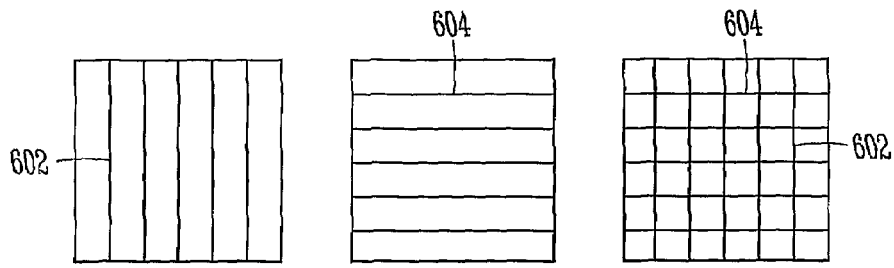
EXAMPLE REFLECTOR CONFIGURATIONS
*FIG. 6A*   *FIG. 6B*   *FIG. 6C*
EXAMPLE REFLECTOR CONFIGURATIONS
*FIG. 6D*   *FIG. 6E*
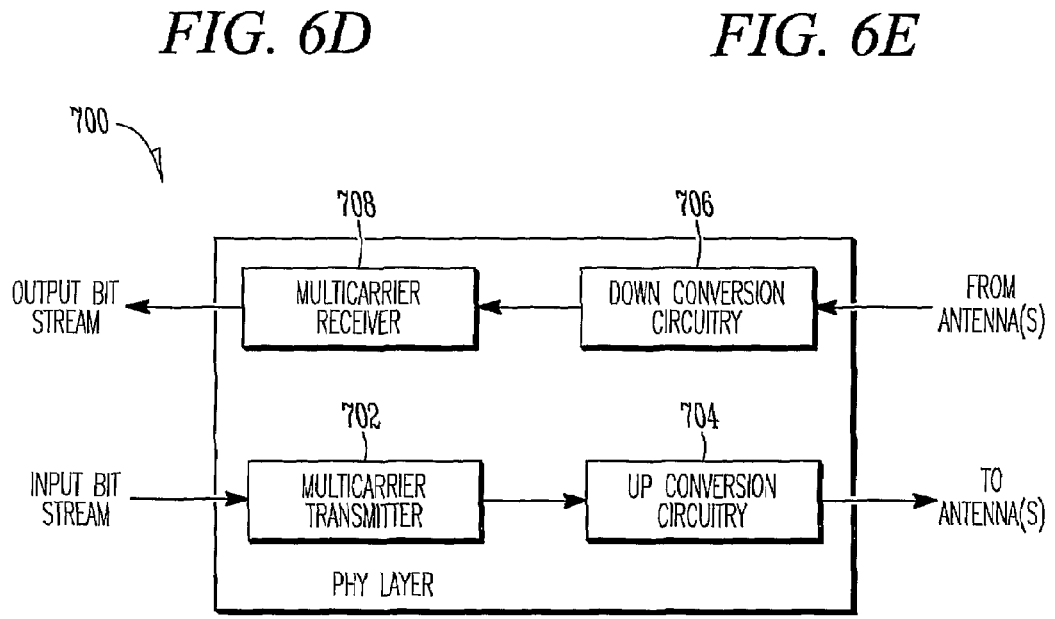
MILLIMETER-WAVE MULTICARRIER BASE STATION
*FIG. 7*

US 8,149,178 B2

MILLIMETER-WAVE COMMUNICATION SYSTEM WITH DIRECTIONAL ANTENNA AND ONE OR MORE MILLIMETER-WAVE REFLECTORS

This application is a U.S. National Stage Filing under 35 U.S.C. 371 from International Application No. PCT/RU2006/000257, filed May 23, 2006 and published in English as WO 2007/136290 on Nov. 29, 2007, which application and publication is incorporated herein by reference in their entireties.

RELATED APPLICATIONS

This patent application relates to currently pending patent [PCT] application filed concurrently in the Russian receiving office having application Ser. No. 12/301,693.

TECHNICAL FIELD

Some embodiments of the present invention pertain to wireless communication systems that use millimeter-wave frequencies. Some embodiments of the present invention pertain to wireless communication systems that use millimeter-wave frequencies to communicate multicarrier signals, such as orthogonal frequency division multiplexed (OFDM) signals.

BACKGROUND

Many conventional wireless communication systems employ either omnidirectional or low-directivity antennas at both the base station and the subscriber stations primarily because of the comparatively long wavelength of the frequencies used. For example, some wireless local area networks use frequencies ranging from about 2.4-5 gigahertz (GHz), which have wavelengths ranging between 6 and 12 centimeters (cm). Directional antennas could improve the throughput of these systems, but the longer wavelengths of the signals make compact directional antennas difficult to implement. Furthermore, the propagation properties of these longer wavelength signals result in a rich multi-path indoor environment which allows multi-antenna multicarrier modulation techniques, such as multiple-input, multiple-output (MIMO) OFDM, to provide reliable coverage, negating any need for directional antennas.

The millimeter-wave band, however, may have available spectrum capable of providing even higher-level throughputs. For example, throughputs of up to several gigabits per second (Gbps) or more may be possible. One issue with using millimeter-wave frequencies for communicating is that millimeter-wave frequencies are easily absorbed by the atmosphere and objects, including humans, wasting a significant portion of their energy. Another issue with using millimeter-wave frequencies for communicating is shadowing, because millimeter-waves generally do not travel around objects. Shadowing makes communicating more difficult in non-line of site (NLOS) situations.

Thus, there are general needs for communications systems and methods for communicating within the millimeter-wave frequency band with greater throughput. There are general needs for communications systems and methods for communicating within the millimeter-wave frequency band that waste less energy and/or mitigate the effects of shadowing.

BRIEF DESCRIPTION OF THE DRAWINGS

FIGS. 6A through 6E illustrate front views of reflector and transreflector configurations suitable for use with some embodiments of the present invention; and FIG. 7 illustrates a functional block diagram of a millimeter-wave base station in accordance with some embodiments of the present invention.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1A:
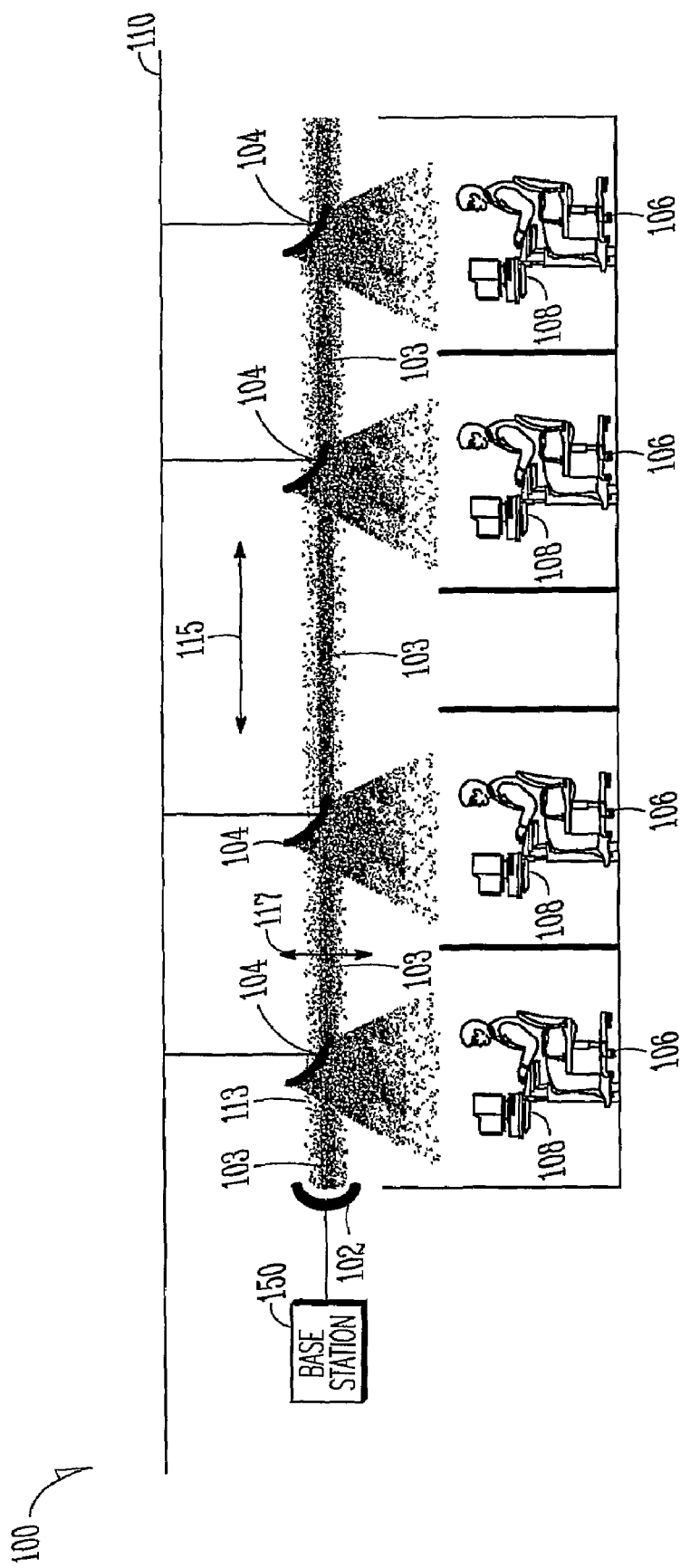
FIG. 1A illustrates a side view of a millimeter-wave communication system in accordance with some embodiments of the present invention.

FIG. 1A illustrates a side view of a millimeter-wave communication system in accordance with some embodiments of the present invention. Millimeter-wave communication system 100 includes base station 150 and directional antenna 102 to direct millimeter-wave signals 113 substantially in horizontal plane 115. Millimeter-wave communication system 100 may also include one or more reflectors 104 positioned to reflect millimeter-wave signals 113 to user devices 108. In some embodiments, millimeter-wave communication system 100 may be an indoor communication system and directional antenna 102 may direct millimeter-wave signals 113 along ceiling 110 above obstacles substantially in horizontal plane 115. In these embodiments, main beam 103 generated by directional antenna 102 may be diverging or more diverging in horizontal plane 115 and substantially non-diverging or less diverging in vertical plane 117 to allow main beam 103 to remain near ceiling 110, although the scope of the invention is not limited in this respect. In some embodiments, one or more reflectors 104 may be positioned on or near ceiling 110 above user locations 106 to reflect millimeter-wave signals 113 to user devices 108.

Although some embodiments of the present invention are described as directing millimeter-waves along ceilings and distributed or reflected by ceiling reflectors, the scope of the invention is not limited in this respect. In some embodiments, millimeter-wave signals may be directed along other flat surfaces such as walls and may be distributed or reflected with surface reflectors such as wall reflectors. Although some embodiments of the present invention are described with respect to vertical and horizontal planes, the terms may be interchanged in some applications.

Millimeter-wave signals may refer to signals having frequencies ranging between approximately 60 and 90 GHz, although the scope of the invention is not limited in this respect as lower and higher frequencies may also be used. Some embodiments of the present invention may be applicable to optical signals. As used herein, the phrase to direct signals may include both receiving and transmitting signals.

Figure 1B:
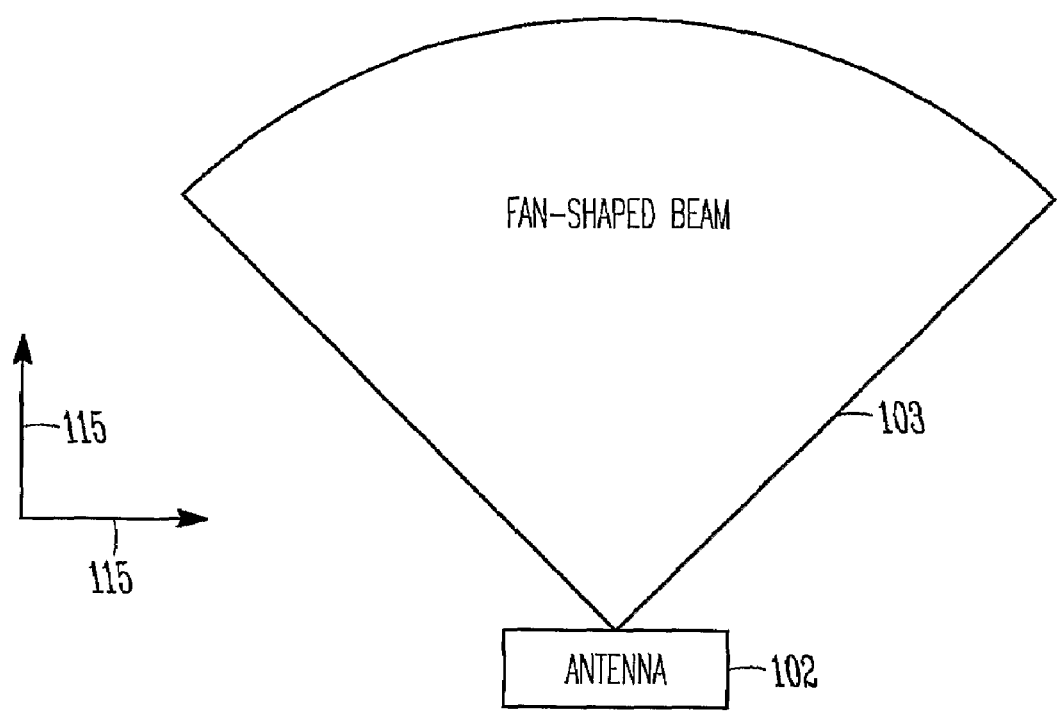
FIG. 1B illustrates a top view of an antenna pattern for a directional antenna suitable for use with some embodiments of the present invention.

FIG. 1B illustrates an antenna pattern for a directional antenna suitable for use with some embodiments of the present invention. The antenna pattern illustrated in FIG. 1B may be suitable for use in millimeter-wave communication system 100 (FIG. 1A). In these embodiments, main beam 103 generated by directional antenna 102 is a flat-wide (i.e., diverging) beam that may be described as a fan-shaped beam, although the scope of the invention is not limited in this respect. In some embodiments, the fan-shaped antenna beam generated by directional antenna 102 may be substantially non-diverging in vertical plane 117 and may be diverging in horizontal plane 115. In some embodiments, the fan-shaped antenna beam may have a vertical aperture size of about 25-50 cm at distance of up to 12-50 meters or more. This may help ensure a more cylindrical path loss on the order of 1/R instead of a more spherical path loss of $1/R^2$, where R is the distance (i.e., radius) from directional antenna 102. This type of energy transmission may be referred to as a layered energy transmission.

In some embodiments, directional antenna 102 may comprise one or more chip-lens arrays, horn antennas, reflector antennas, slot antennas, or slotted-waveguide antennas. In some embodiments, directional antenna 102 may also include one or more millimeter-wave lenses to help direct the millimeter-wave signals. These embodiments are described in more detail below.

Referring back to FIG. 1A, user devices 108 may include a directional antenna to receive millimeter-wave signals 113 reflected by one of reflectors 104 and to substantially exclude receipt of millimeter-wave signals 113 from other of reflectors 104. In some embodiments, the directional antenna of a user device 108 may be able to be directed upward toward ceiling 110 to receive and/or transmit millimeter-wave signals 113 reflected by one of reflectors 104 from an upward direction. In these embodiments, the directional antenna of user device 108 may be sufficiently directional to receive signals from one reflector 104 and to reduce the reception of multipath components of the millimeter-wave signals from other reflectors 104, although the scope of the invention is not limited in this respect. In some embodiments, base station 150 and/or user devices 108 may include circuitry to further mitigate the effects of any multipath propagation, although the scope of the invention is not limited in this respect.

In some embodiments, the positions of reflectors 104 may be adjusted and/or selected to provide signal coverage to each of user devices 108. In some embodiments, the positions of reflectors 104 may be selected to reflect most of the transmitted energy directly to user devices 108. These embodiments may waste less transmitted energy illuminating less important areas which may help improve the power efficiency of millimeter-wave communication system 100. In some embodiments, millimeter-wave communication system 100 may be viewed as an under-ceiling open waveguide system. In some embodiments, for a noise factor of 5 dB, an implementation margin of 5 dB, and a receiver antenna gain of 6 dB for user devices 108, as little as 10 milliwatts (mW) of radiated energy may be used to provide a throughput of up to 1.5 Gbps within the area of approximately 180 square meters when the area is substantially uniformly illuminated. In these embodiments, reflectors may have a size ranging between approximately 0.025 and 0.25 square meters. In some embodiments, millimeter-wave communication system 100 may be suitable for use in a home, in an office with cubicles, and in hotspots at airports, shopping centers, and cafes, although the scope of the invention is not limited in this respect.

Figure 2A:
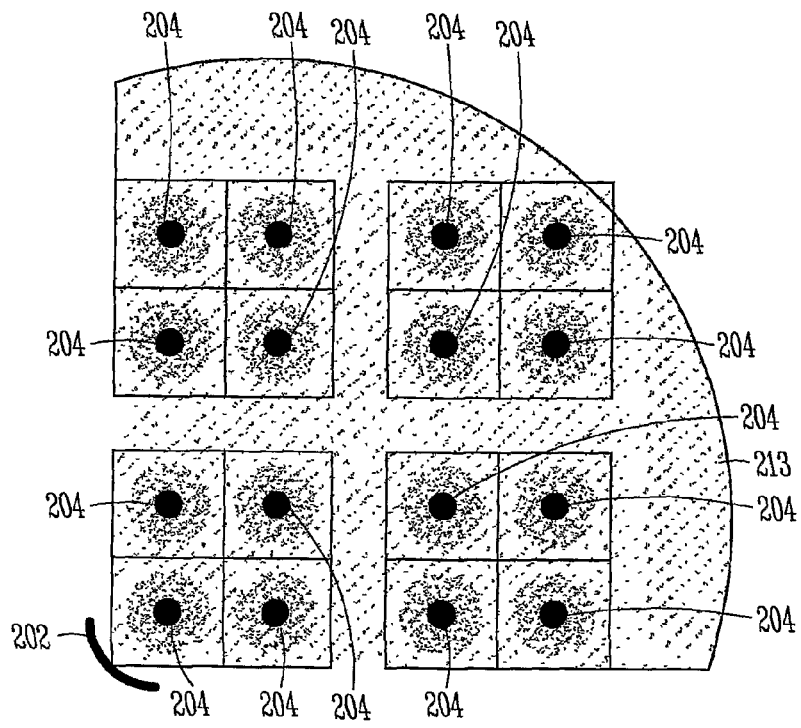
FIG. 2A illustrates a top view of a millimeter-wave communication system in accordance with some embodiments of the present invention.

FIG. 2A illustrates a top view of a millimeter-wave communication system in accordance with some embodiments of the present invention. As illustrated in FIG. 2A, directional antenna 202 directs millimeter-wave signals 213 substantially in a horizontal plane to one or more reflectors 204 for receipt by user devices (not illustrated). In the embodiments illustrated in FIG. 2A, directional antenna 202 may correspond to directional antenna 102 (FIGS. 1A and 1B) and reflectors 204 may correspond to reflectors 104 (FIG. 1A).

In these embodiments, a fan-shaped beam in the horizontal plane may direct millimeter-wave signals to most of all of reflectors 204. In some of these embodiments, a wide-angle or omnidirectional antenna pattern in horizontal plane 115 (FIGS. 1A and 1B) may be used, which may illuminate most or all of reflectors 204 simultaneously. In these embodiments, a path loss on the order of 1/R may result, where R is the distance from directional antenna 202 to a user device. In some embodiments, the user devices may receive signals from several reflectors 204 simultaneously utilizing the multipath components present in the received signal. In these embodiments, multicarrier signals with a longer guard interval length may be used, although the scope of the invention is not limited in this respect.

Figure 2B:
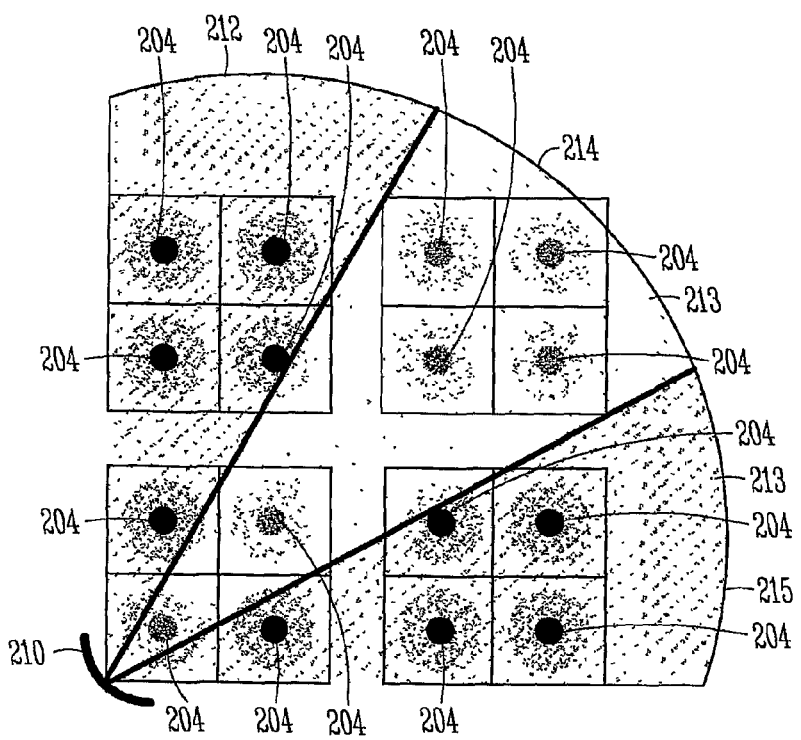
FIG. 2B illustrates a top view of a millimeter-wave communication system in accordance with some multi-sector embodiments of the present invention.

FIG. 2B illustrates a top view of a millimeter-wave communication system in accordance with some multi-sector embodiments of the present invention. In these embodiments, multi-sector directional antenna 210 may direct millimeter-wave signals 213 in a manner in one or more sectors, illustrated generally as sectors 212, 214, and 215. Each sector 212, 214, and 215 may include one or more of reflectors 204 positioned to reflect millimeter-wave signals 213 to user devices when illuminated by multi-sector directional antenna 210. In the embodiments illustrated in FIG. 2B, multi-sector directional antenna 210 may correspond to directional antenna 102 (FIGS. 1A and 1B) and reflectors 204 may correspond to reflectors 104 (FIG. 1A).

In the multi-sectored embodiments illustrated in FIG. 2B, increased antenna gain may be achieved which may improve the power efficiency of millimeter-wave communication system 100. In some embodiments, directional antenna 210 may employ scanning across an azimuth angle in the horizontal plane.

In some embodiments, multi-sector directional antenna 210 comprises a chip-lens antenna array to direct the millimeter-wave signals within a selected one or more of sectors 212, 214 and 215. In these embodiments, the chip-lens antenna array may include a chip-array to generate and to steer a millimeter-wave antenna beam within a selected one of sectors 212, 214 and 215, and a millimeter-wave lens to shape the millimeter-wave antenna beam for direction within the horizontal plane. In some embodiments, multi-sector directional antenna 210 may comprise one or more chip-arrays and one or more millimeter-wave lenses, although the scope of the invention is not limited in this respect. In some embodiments, directional antenna 210 may comprise chip-array to generate a millimeter-wave antenna beam and a millimeter-wave reflector to shape the millimeter-wave antenna beam for direction within the horizontal plane.

In some of these embodiments, base station 150 (FIG. 1A) may provide the millimeter-wave signals to the chip-lens antenna array to selectively serve some or all of sectors 212, 214 and 215. In some embodiments, base station 150 (FIG. 1A) may provide control signals to the chip-array to cause the chip-array to direct the millimeter-wave antenna beam within the selected one or more of sectors 212, 214 and 215 to either transmit millimeter-wave signals to or receive millimeter-wave signals from the selected one or more of sectors 212, 214 and 215. In some embodiments, sectors 212, 214 and 215 may be serviced in a sequential manner. In other embodiments, one or more of sectors may be served in parallel. Although FIG. 2B illustrates three sectors, the scope of these embodiments includes as few as two sectors and as great as several tens of sectors depending on the directivity of multi-sector directional antenna 210 within each sector.

Figure 2C:
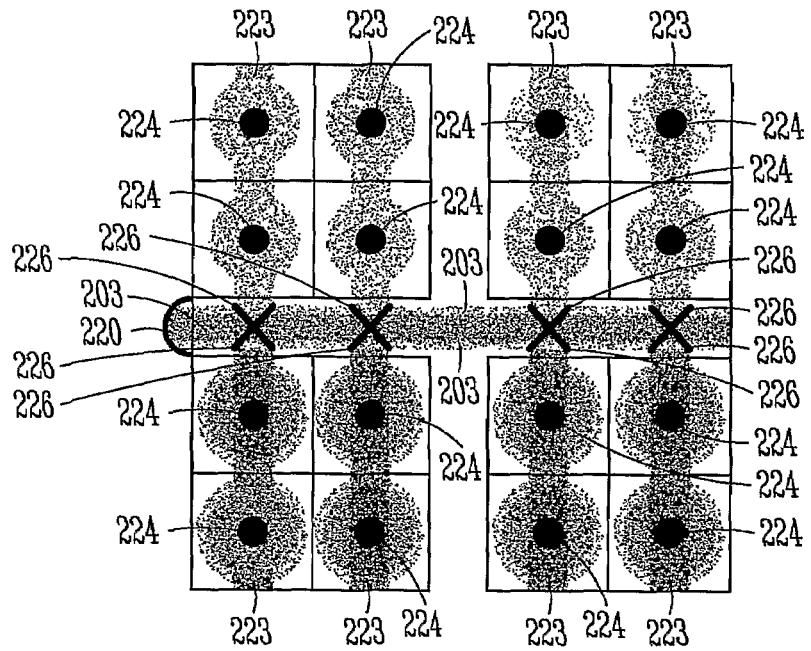
FIG. 2C illustrates a top view of a millimeter-wave communication system in accordance with some distributed-beam embodiments of the present invention.

FIG. 2C illustrates a top view of a millimeter-wave communication system in accordance with some distributed-beam embodiments of the present invention. In these embodiments, directional antenna 220 directs millimeter-wave signals within main beam 203 to one or more distributing reflectors 226. In these embodiments, one or more of distributing reflectors 226 may reflect at least portions of main beam 203 to provide one or more distributed beams 223. In these embodiments, secondary reflectors 224 may be positioned within one of distributed beams 223 to reflect one of distributed beams 223 to user devices 108 (FIG. 1A). In these embodiments, directional antenna 220 may correspond to directional antenna 102 (FIG. 1A) and secondary reflectors 224 may correspond to reflectors 104 (FIG. 1A).

In some embodiments, main beam 203 may be a collimated beam (e.g., in the form of a horizontal column) which may be substantially non-diverging in both the horizontal and vertical planes. In these embodiments, directional antenna 220 may direct main beam 203 along a path comprising a series of distributing reflectors 226. Each successive distributing reflector 226 may receive portions of millimeter-wave signals of main beam 203 that were not reflected by a prior distributing reflector 226 in the series. In some indoor embodiments, the series of distributing reflectors 226 may be in a line along a ceiling, although the scope of the invention is not limited in this respect. In some of these embodiments, at least some of distributing reflectors 226 may comprise reflective-transmissive elements to reflect a portion of main beam 203 in one or more directions to allow another portion of main beam 203 to pass. The reflective-transmissive elements may comprise millimeter-wave transreflectors. In some embodiments, the reflective-transmissive elements may reflect portions of main beam 203 having a first polarization and may pass portions of main beam 203 having a second polarization. In some embodiments, the second polarization may be substantially ninety-degrees with respect to the first polarization. In some embodiments, the first and second polarizations may be horizontal and vertical polarizations, although the scope of the invention is not limited in this respect. In some of these embodiments, directional antenna 220 may direct main beam 203 along a path comprising a series of reflective-transmissive elements and each successive reflective-transmissive element may receive millimeter-wave signals from a prior reflective-transmissive element. Some examples of reflectors and transreflectors are described in more detail below.

Figure 2D:
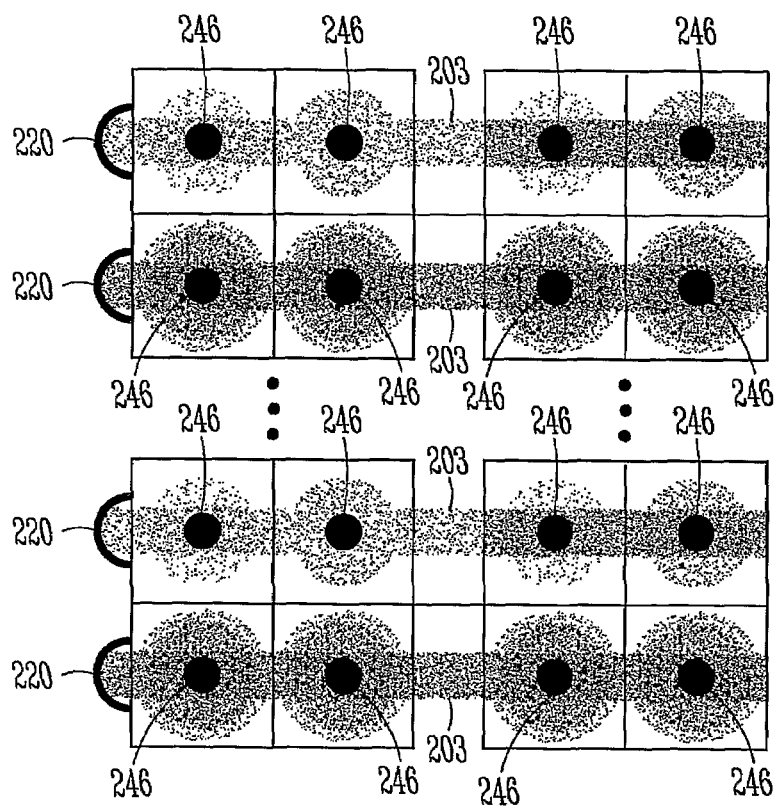
FIG. 2D illustrates a top view of a millimeter-wave communication system in accordance with some other embodiments of the present invention.

FIG. 2D illustrates a top view of a millimeter-wave communication system in accordance with some other embodiments of the present invention. In these embodiments, one or more directional antennas 220 may direct millimeter-wave signals within a corresponding one or more of main beams 203 to one or more reflectors 246. In these embodiments, reflectors 246 may be positioned within one of main beams 203 to reflect the millimeter-wave signals to user devices. In these embodiments, each of directional antennas 220 may correspond to directional antenna 220 (FIG. 2C) and reflectors 246 may correspond to reflectors 104 (FIG. 1A).

The embodiments illustrated in FIGS. 2C and 2D may realize some of the advantages offered by millimeter-wave frequencies by providing a canalized or layered signal transfer within the space below a ceiling that may be free of obstructions in many indoor scenarios. This space, for example, may be about 50 cm below a ceiling, although the scope of the invention is not limited in this respect. In these embodiments, one or more of directional antennas 220 may direct main beams 203 in the horizontal plane. In these embodiments, main beams 203 may be rather narrow (e.g., 25-50 cm) in the vertical plane. In some embodiments, main beam 203 may be a collimated beam (i.e., a substantially non-diverging beam in both the horizontal and vertical planes), although the scope of the invention is not limited in this respect.

The embodiments illustrated in FIGS. 2C and 2D may be referred to as quasi-optical embodiments. In these embodiments, main beam 203 may be viewed as being transmitted through an open-beam waveguide in which the diffractional loss of power that may depend on the distance from directional antenna 220 to a reflector above a user device may be considered negligible. Therefore, these embodiments may be more power efficient.

Figure 3:
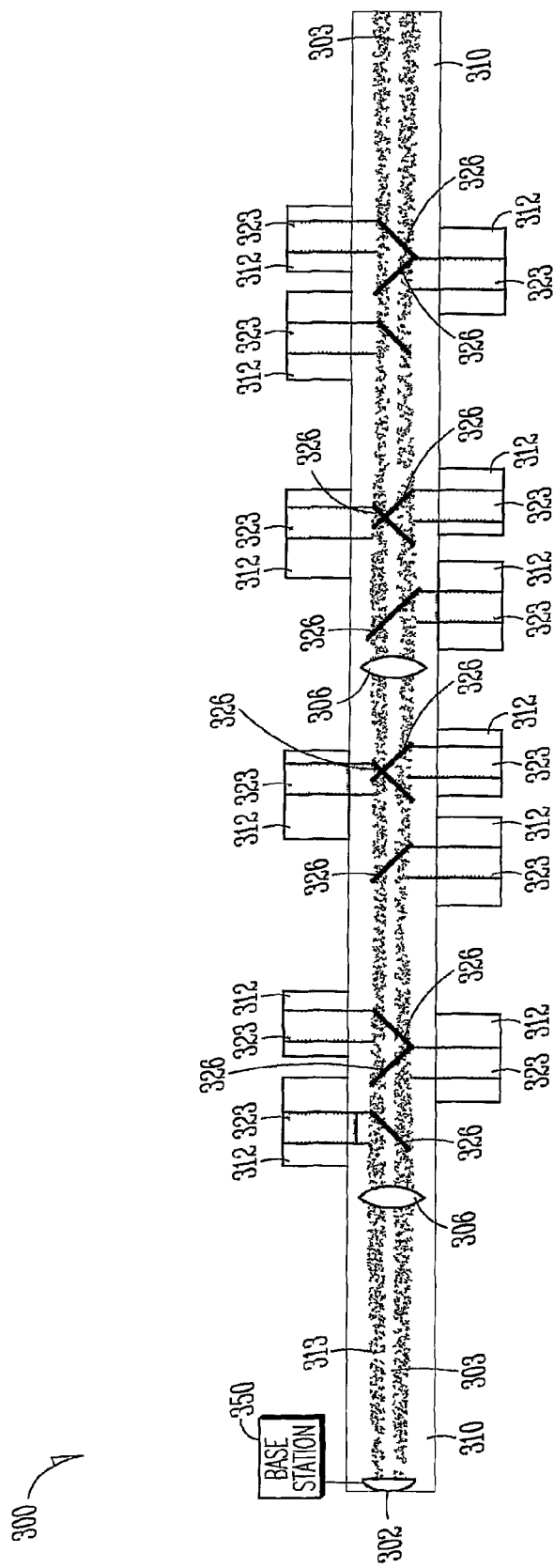
FIG. 3 illustrates a top view of a millimeter-wave communication system in accordance with some other distributed-beam embodiments of the present invention.

FIG. 3 illustrates a top view of a millimeter-wave communication system in accordance with some other distributed-beam embodiments of the present invention. Millimeter-wave communication system 300 includes base station 350 and directional antenna 302 to direct millimeter-wave signals 313 to form main beam 303. In these embodiments, main beam 303 may be a narrow, substantially non-diverging beam comprising millimeter-wave signals 313. Millimeter-wave communication system 300 may also include one or more millimeter-wave lenses 306 positioned within main beam 303 to re-focus and/or re-direct main beam 303. Millimeter-wave communication system 300 may also include one or more distributing reflectors 326 to reflect at least portions of main beam 303 to provide one or more distributed beams 323. Secondary reflectors (not illustrated) may be positioned within distributed beams 323 to reflect distributed beams 323 to user devices. In some embodiments, distributing reflectors 326 may comprise millimeter-wave transreflectors that may reflect portions of millimeter-wave signals 313, allowing other portions of millimeter-wave signals 313 to pass.

The embodiments of millimeter-wave communication system 300 illustrated in FIG. 3 may also realize some of the advantages offered by millimeter-wave frequencies by providing a canalized or layered signal transfer within the space below a ceiling that may be free of obstructions. In these embodiments, directional antenna 302 may be placed below a ceiling and may direct main beam 303 in the horizontal plane. In these embodiments, main beam 303 may be rather narrow (e.g., 25-50 cm). In some embodiments, main beam 303 may be a collimated beam (i.e., substantially non-diverging beam in both horizontal and vertical planes), although the scope of the invention is not limited in this respect.

In some embodiments, directional antenna 302 may generate a needle-shaped substantially non-diverging beam, although the scope of the invention is not limited in this respect. In some embodiments, millimeter-wave lenses 306 positioned within main beam 303 may re-focus main beam 303 to help keep main beam 303 substantially non-diverging and/or needle shaped as it propagates over a distance.

In some embodiments, the use of millimeter-wave lenses 306 (FIG. 3) and/or distributing reflectors 326 located at a distance from directional antenna 302 may effectively create an open waveguide to increase several times the range of a signal delivery (up to 150-250 meters). This may allow a canalized energy transfer from base station 350 (FIG. 3) to user devices, keeping the path loss low.

In some embodiments, millimeter-wave communication system 300 may be an indoor communication system and directional antenna 302 may direct millimeter-wave signals 313 along a ceiling of main room 310. In some embodiments, directional antenna 302 may generate main beam 303 to be substantially non-diverging. In some embodiments, each of distributing reflectors 326 may reflect at least portions of main beam 303 into other rooms 312. In some embodiments, millimeter-wave communication system 300 may be used at a location, such as an airport or shopping mall, and other rooms 312 may include locations such as cafes, stores, shops, and/or waiting rooms adjacent to main room 310, although the scope of the invention is not limited in this respect.

Referring to FIGS. 1A, 1B, 2A, 2B, 2C, 2D and 3, in some embodiments, directional antenna 102 (FIGS. 1A and 1B), directional antenna 202 (FIG. 2A), directional antenna 210 (FIG. 2B), directional antenna 220 (FIG. 2C), directional antennas 220 (FIG. 2D) and directional antenna 302 (FIG. 3) may comprise almost any type of antenna or antenna structure that may provide either a directional or a highly-directional antenna pattern. In some embodiments one or more horn antennas, reflector antennas, patch antennas, dipole antennas, loop antennas, and/or microstrip antennas may be used. In some embodiments, phase-array antennas may be used. In some embodiments, instead of two or more antennas, a single antenna with multiple apertures may be used. In these embodiments, each aperture may be considered a separate antenna. In some embodiments that use phased-array antennas, an amplifier element may be provided for each antenna element or for groups of antenna elements, although the scope of the invention is not limited in this respect. In some embodiments, a reflector or millimeter-wave lens may be employed by one or more of the antennas to achieve a relatively large vertical aperture size to provide a substantially non-diverging beam in the vertical plane and a diverging beam in the horizontal plane.

In some embodiments, directional antenna 102 (FIGS. 1A and 1B), directional antenna 202 (FIG. 2A), directional antenna 210 (FIG. 2B), directional antennas 220 (FIG. 2C), directional antennas 220 (FIG. 2D) and/or directional antenna 302 (FIG. 3) may comprise a chip-lens array antenna having a millimeter-wave lens to shape the main beam and a chip-array to generate and direct an incident beam of millimeter-wave signals through the millimeter-wave lens for subsequent transmission to the user devices. In some of these embodiments that use a fan-shaped beam, the millimeter-wave lens may have an inner surface and an outer surface with curvatures selected to provide main beam as diverging in the horizontal plane and main beam as substantially non-diverging beam in the vertical plane, although the scope of the invention is not limited in this respect.

In some embodiments, the chip-array may be coupled to control circuitry to steer the incident beam within the millimeter-wave lens to direct the millimeter-wave signals among the plurality of reflectors. In some of these embodiments, the chip-array may comprise either a linear or planar array of antenna elements coupled to a millimeter-wave signal path through control elements. The control elements may control the amplitude and/or the phase shift between the antenna elements. In some of these embodiments, the millimeter-wave lens comprises a cross-linked polymer refractive material that is transparent to millimeter-wave signals. In some embodiments that employ multi-sectors, a plurality of chip-arrays may be used. In these multi-sector embodiments, one chip array may be associated with each sector, although the scope of the invention is not limited in this respect.

In some embodiments, reflectors 104 (FIG. 1A), reflectors 204 (FIG. 2A & FIG. 2B), reflectors 224 (FIG. 2C), distributing reflectors 226 (FIG. 2C), reflectors 246 (FIG. 2D), and/or distributing reflectors 326 (FIG. 3) may comprise almost any type of material or configuration that reflects millimeter-waves. In some embodiments, the material and configuration may be selected to reflect a particular millimeter-wave frequency used. In some embodiments, one or more of the reflectors may comprise either a solid metallic or dielectric sheet. In other embodiments, one or more of the reflectors may comprise a metallic or dielectric grill or mesh structure. In some other embodiments, one or more of the reflectors may comprise sets of metallic or dielectric wires or strips. In some embodiments, a metallic paint may be used to reflect the millimeter-wave signals of a particular millimeter-wave frequency used. In some embodiments, when the reflectors comprise a metallic grill or mesh structure, the spacing between the elements may be selected to not significantly exceed a half-wavelength. In some embodiments, the spacing between elements may be varied across the aperture of the antenna to produce a directional or highly directional antenna pattern.

In some embodiments, when the reflectors use a grille or mesh structure, the grill or mesh structure may be selected to reflect one polarization (e.g., horizontal) and pass another polarization (e.g., vertical) to provide a transreflector. In some embodiments, the grille or mesh structure may be selected to pass different portions of energy and reflect the remaining energy. These semi-transparent embodiments may be suitable for use as distributing reflectors 226 (FIG. 2C) and/or distributing reflectors 326 (FIG. 3). In some other embodiments, one or more of the reflectors may include sets of metallic elements, such as wires, that may be about a half-wavelength long. The sets of metallic elements may be positioned to reflect all or some of the millimeter-wave signals. In this way, these reflectors may also be semi-transparent at millimeter-wave frequencies. Examples of suitable reflector and transreflector configurations are described in more detail below.

In some embodiments, the reflectors and/or the transreflectors may comprise one or more of metallic reflectors configured to reflect a predetermined millimeter-wave frequency. In some embodiments, the reflectors and/or the transreflectors may comprise dielectric reflectors comprising dielectric material selected to reflect the predetermined millimeter-wave frequency. In some embodiments, the reflectors and/or the transreflectors may comprise dielectric-metallic reflectors comprising a dielectric material with a metallic coating configured to reflect the predetermined millimeter-wave frequency. In some embodiments, the reflectors and/or the transreflectors may comprise metallic mesh structures configured to reflect the predetermined millimeter-wave frequency. In some embodiments, the reflectors and/or the transreflectors may comprise dielectric-metallic reflectors comprising a plurality of metallic elements positioned on a dielectric material. In these embodiments, the spacing and the length of the metallic elements may be selected to reflect one or more components of the predetermined millimeter-wave frequency.

Figure 4:
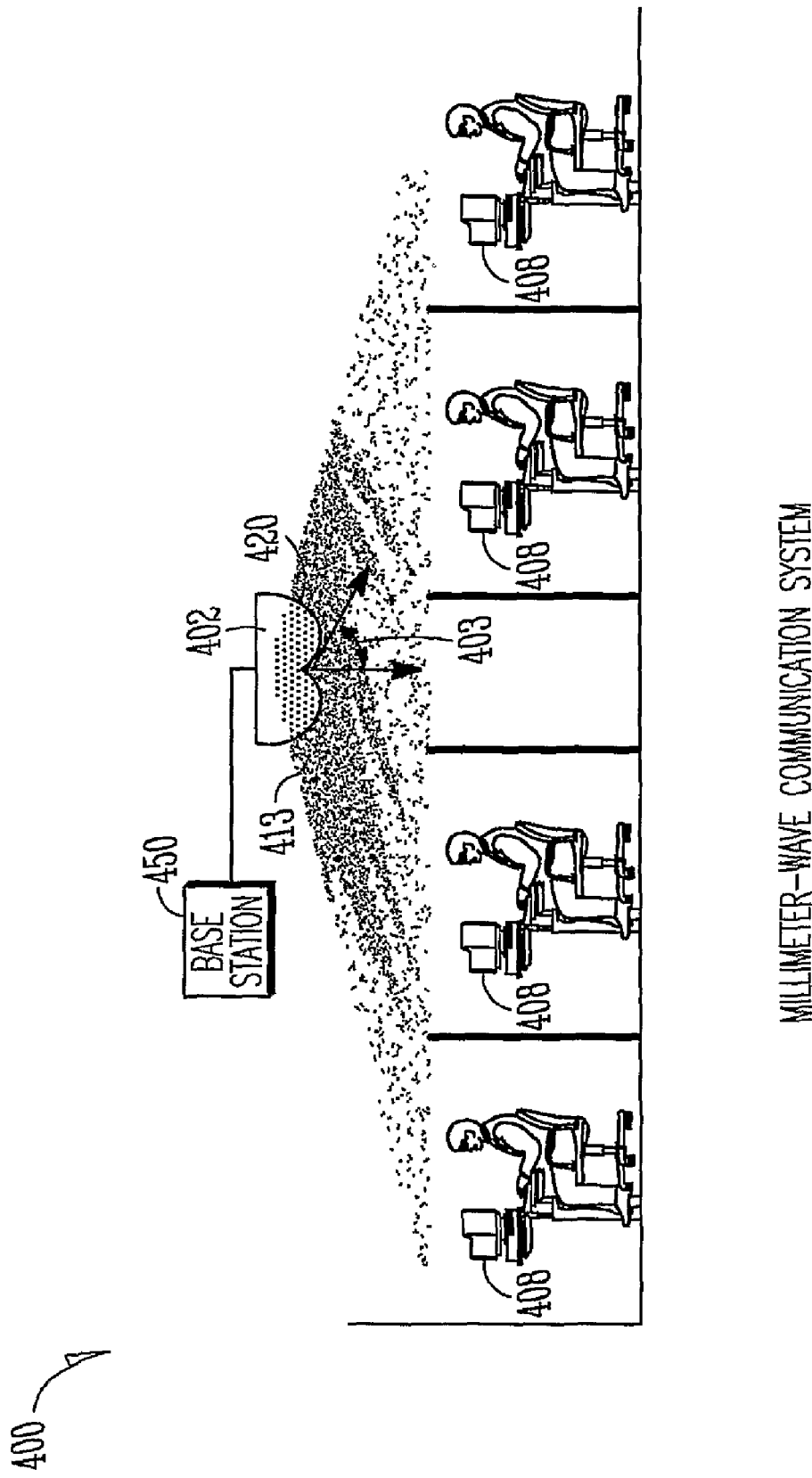
FIG. 4 illustrates a side view of a millimeter-wave communication system in accordance with some embodiments of the present invention.

FIG. 4 illustrates a side view of a millimeter-wave communication system in accordance with some embodiments of the present invention. Millimeter-wave communication system 400 may include directional antenna 402 to direct millimeter-wave signals 413 to one or more user devices 408. In these embodiments, directional antenna 402 may transmit millimeter-wave signals 413 within a selected one or more of a plurality of sectors with an antenna gain pattern that depends on an elevation angle 403 to user devices 408. Millimeter-wave communication system 400 may also include base station 450 to generate the millimeter-wave signals. In some embodiments, directional antenna 402 transmits millimeter-wave signals 413 with a substantially secant-squared ($sec^2$) vertical pattern and a substantially omnidirectional horizontal pattern to provide the antenna gain pattern that depends on elevation angle 403. These embodiments may help ensure that substantially equal signal power in the downlink is provided at user devices 408 substantially independent of the distance from directional antenna 402, at least over a certain range. Likewise, in the uplink, substantially equal antenna sensitivity to signals transmitted by user devices 408 may be provided substantially independent to the distance to directional antenna 402, at least over a certain range. In some of these embodiments, a downlink signal received by a user device 408 experiences path loss that may be inversely proportional to the squared distance traveled by the signal. In these embodiments, the signals arriving at each of user device 408 may be inversely proportional to square of the secans of elevation angle 403, which may allow remote user devices 408 to signals just as well as near user devices. In some embodiments, the substantially secant-squared pattern may be referred to as a co-secant-squared (CSC) pattern, although the scope of the invention is not limited in this respect.

In some embodiments, the plurality of sectors that may be served by millimeter-wave communication system 400 may comprise either sectors of a horizontal plane or sectors of a vertical plane. In some other embodiments, plurality of sectors may comprise sectors within both the horizontal plane and the vertical plane. Examples of different sector configurations are described below.

In some embodiments, directional antenna 402 comprises a chip-lens antenna array to direct the millimeter-wave signals within the selected one or more of the sectors. In some embodiments, the chip-lens antenna array may include a chip-array to generate and to steer a millimeter-wave antenna beam in a horizontal and/or vertical plane, and millimeter-wave lens 420 to shape the millimeter-wave antenna beam in accordance with the substantially secant-squared vertical pattern. In some embodiments, the chip-lens array antenna may comprise one or more chip-arrays and one or more millimeter-wave lenses 420, although the scope of the invention is not limited in this respect.

In some embodiments, directional antenna 402 comprises a chip-lens antenna to direct the millimeter-wave signals within a selected one or more of the sectors. In these embodiments, the chip-lens antenna may comprise a millimeter-wave lens to shape the millimeter-wave signals in accordance with the substantially secant-squared pattern in the vertical plane and substantially omnidirectional pattern in the horizontal plane. The chip-lens array antenna may also include a chip-array to generate and direct the millimeter-wave signals through the millimeter-wave lens for subsequent transmission. In some of these embodiments, the millimeter-wave lens may have a substantially spherical inner surface and may have an outer surface defined by first and second portions. The first and second portions of the outer surface may be selected to provide the substantially omnidirectional pattern in the horizontal plane and the substantially secant-squared pattern in the vertical plane. In some embodiments, the chip-array may comprise either a linear or planar array of antenna elements coupled to a millimeter-wave signal path through control elements. The control elements may control the amplitude and/or phase shift between the antenna elements to steer in incident beam within the lens. In some embodiments, millimeter-wave lens may comprise a cross-linked polymer refractive material that is substantially transparent to millimeter-wave signals, although the scope of the invention is not limited in this respect.

In some embodiments, base station 450 may provide millimeter-wave signals to the chip-lens arrays to selectively serve the sectors. Base station 450 may also provide the control signals to the chip-lens arrays to direct the millimeter-wave antenna beam within the selected one or more of the sectors to either transmit millimeter-wave signals to or receive millimeter-wave signals from the selected one or more of the sectors. In some embodiments, the various sectors may be served in a sequential manner. In other embodiments, one or more of the sectors may be served in parallel. In some multi-sector embodiments of millimeter-wave communication system 400, directional antenna 402 may comprise separate antenna elements, such as separate chip-lens arrays, to serve one or more sectors.

Figure 5C:
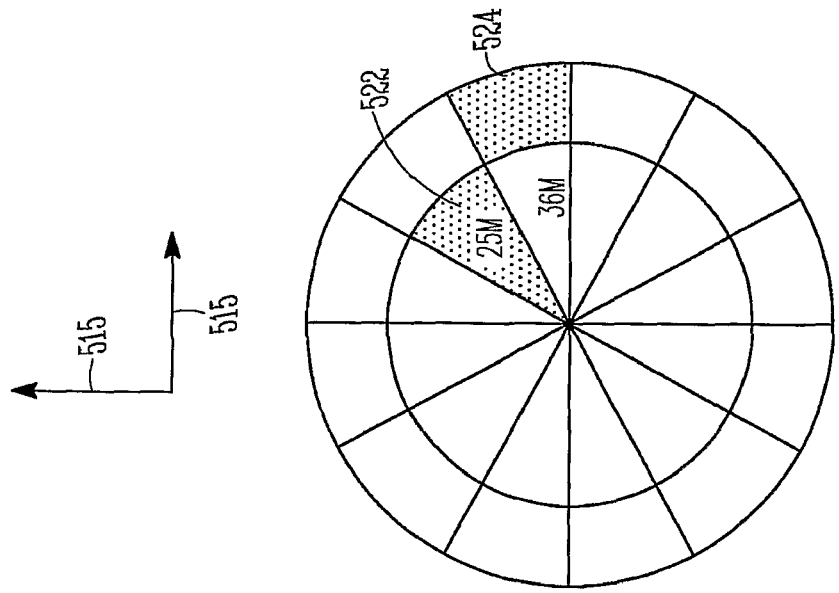
FIGS. 5A, 5B and 5C illustrate top views of antenna sectors in accordance with some multi-sector embodiments of the present invention.
Figure 5B:
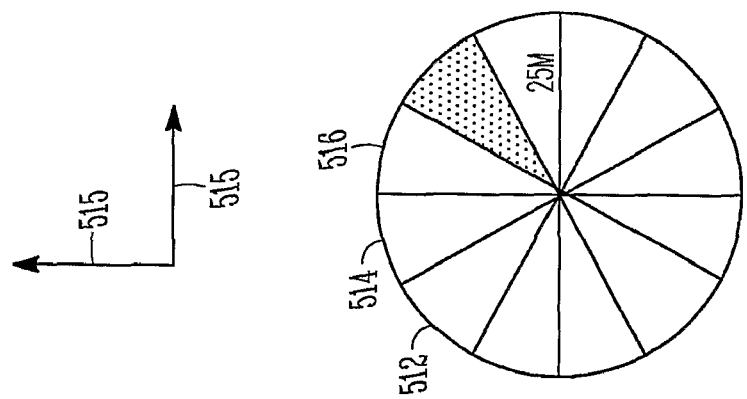
Figure 5A:
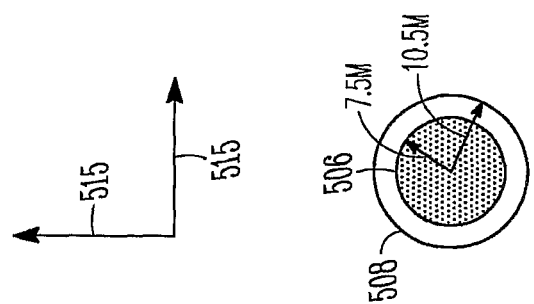

FIGS. 5A, 5B, and 5C illustrate top views of antenna sectors in accordance with some multi-sector embodiments of the present invention. FIG. 5A illustrates sectors 506 and 508 of different radii in horizontal plane 515. FIG. 5B illustrates a plurality of sectors 512, 514 and 516 with different azimuth angles in horizontal plane 515. FIG. 5C illustrates sectors 522 and 524 of different radii and with different azimuth angles in horizontal plane 515. In some of these embodiments, directional antenna 402 (FIG. 4) direct millimeter-wave signals with a secant-squared directivity pattern within one or more of the sectors. In some embodiments, directional antenna 402 (FIG. 4) direct millimeter-wave signals with a secant-squared directivity pattern within one or more of the sectors in a time-multiplexed manner, although the scope of the invention is not limited in this respect.

In the example of FIG. 5A, sector 506 is illustrated as having a radius of 7.5 meters (M) and sector 508 is illustrated as having a radius of 10.5M. In the example of FIG. 5B, sectors 512, 514 and 516 are illustrated as having a radius of 25M. In the example of FIG. 5C, sector 522 is illustrated as having a radius of 25M and sector 524 is illustrated as having a radius extending to 36M. The lengths of the radii of the various sectors illustrated in FIGS. 5A, 5B, and 5C are for illustrative purposes. The scope of the invention is not limited in this respect as other radii sectors are also applicable.

In some embodiments, directional antenna 402 (FIG. 4) may comprise separate directional antenna elements to serve each of the various sectors. In other embodiments, directional antenna 402 (FIG. 4) may comprise a chip-lens antenna array to selectively serve the sectors as discussed above.

FIGS. 6A through 6E illustrate front-views of reflector and transreflector configurations suitable for use with some embodiments of the present invention. The reflectors and transreflectors illustrated in FIGS. 6A through 6E may be suitable for use as reflectors 104 (FIG. 1A), reflectors 204 (FIGS. 2A and 2B), reflectors 224 (FIG. 2C), distributing reflectors 226 (FIG. 2C), reflectors 246 (FIG. 2D) and/or distributing reflectors 326 (FIG. 3), although other reflector and transreflector configurations are also suitable.

FIG. 6A illustrates an example of a reflector/transreflector configuration with vertical metallic elements 602 that may substantially reflect vertically-polarized millimeter-wave signals and allow horizontally-polarized millimeter-wave signals to pass. FIG. 6B illustrates an example of a reflector/transreflector configuration with horizontal metallic elements 604 that may reflect horizontally-polarized millimeter-wave signals and allow vertically-polarized millimeter-wave signals to pass. FIG. 6C illustrates an example of a reflector configuration with both vertical metallic elements 602 and horizontal metallic elements 604 that may reflect most or all components (i.e., both horizontally and vertically-polarized components) of millimeter-wave signals. FIG. 6D illustrates an example of a reflector/transreflector configuration with metallic elements 606 positioned vertically to substantially reflect vertically-polarized millimeter-wave signals. FIG. 6E illustrates an example of a reflector configuration with metallic elements 606 positioned vertically and metallic elements 608 positioned horizontally to substantially reflect most or all millimeter-wave signals of a particular frequency. The size and/or spacing between the metallic elements may be selected based on the particular millimeter-wave frequency and to achieve certain reflective and transmissive properties.

FIG. 7 illustrates a functional block diagram of a millimeter-wave multicarrier base station in accordance with some embodiments of the present invention. Millimeter-wave multicarrier base station 700 may be suitable for use as base station 150 (FIG. 1A), millimeter-wave base station 350 (FIG. 3) and/or millimeter-wave base station 450 (FIG. 4), although other base station configurations may also be suitable.

Millimeter-wave multicarrier base station 700 may include multicarrier transmitter 702 to generate multicarrier signals from an input bit stream, and up conversion circuitry 704 to upconvert the multicarrier signals to millimeter-wave multicarrier signals for transmission by one or more antennas. Millimeter-wave multicarrier base station 700 may also include down conversion circuitry 706 to downconvert millimeter-wave multicarrier signals received through one or more antennas, and multicarrier receiver 708 to convert the downconverted signals to an output bit stream. FIG. 7 illustrates a physical (PHY) layer of millimeter-wave multicarrier base station 700, however millimeter-wave multicarrier base station 700 may include other layers, such as a media access control (MAC) layer to receive the output bit steam from the PHY layer and generate the input bit stream for the PHY layer. In some embodiments, user devices, such as user devices 108 (FIG. 1A) and user devices 408 (FIG. 4) may have a similar PHY layer. In some embodiments, the PHY layer may be implemented in a network-interface card (NIC).

Although millimeter-wave multicarrier base station 700 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of millimeter-wave multicarrier base station 700 may refer to one or more processes operating on one or more processing elements.

In some embodiments, millimeter-wave communication system 100 (FIG. 1A), millimeter-wave communication system 300 (FIG. 3), and/or millimeter-wave communication system 400 (FIG. 4) may communicate using multicarrier communication signals such as OFDM communication signals. The multicarrier communication signals may be within the millimeter-wave frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers, and/or each subcarrier may have an integer number of cycles within a symbol period, although the scope of the invention is not limited in this respect. In some embodiments, millimeter-wave communication system 100 (FIG. 1A), millimeter-wave communication system 300 (FIG. 3), and/or millimeter-wave communication system 400 (FIG. 4) may communicate in accordance with a multiple access technique, such as orthogonal frequency division multiple access (OFDMA), although the scope of the invention is not limited in this respect.

In some other embodiments, millimeter-wave communication system 100 (FIG. 1A), millimeter-wave communication system 300 (FIG. 3), and/or millimeter-wave communication system 400 (FIG. 4) may communicate using single-carrier signals, although the scope of the invention is not limited in this respect. In some embodiments, millimeter-wave communication system 100 (FIG. 1A), millimeter-wave communication system 300 (FIG. 3), and/or millimeter-wave communication system 400 (FIG. 4) may communicate using spread-spectrum signals, although the scope of the invention is not limited in this respect.

In some embodiments, base station 150 (FIG. 1A), base station 350 (FIG. 3), and/or base station 450 (FIG. 4) may be part of a communication station, such as wireless local area network communication station, or an access point (AP) that communicates using millimeter-wave frequencies. In some other embodiments, base station 150 (FIG. 1A), base station 350 (FIG. 3), and/or base station 450 (FIG. 4) may be part of a wireless access network communication station, such as a broadband wireless access (BWA) network communication station, such as a Worldwide Interoperability for Microwave Access (WiMax) communication station, that communicates using millimeter-wave frequencies.

In some embodiments, user devices 108 (FIG. 1A) and user devices 408 (FIG. 4) may be a portable wireless communication device such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that may receive and/or transmit information wirelessly.

In some embodiments, millimeter-wave communication system 100 (FIG. 1A), millimeter-wave communication system 300 (FIG. 3), and/or millimeter-wave communication system 400 (FIG. 4) may communicate substantially in accordance with specific communication standards or proposed specifications, such as the Institute of Electrical and Electronics Engineers (IEEE) standards, including the IEEE 802.15 standards and proposed specifications for millimeter-wave communications (e.g., the IEEE 802.15 task group 3c Call For Intent (CFI) dated December 2005), although the scope of the invention is not limited in this respect as they may also be suitable to transmit and/or receive communications in accordance with other techniques and standards. For more information with respect to the IEEE 802.15 standards, please refer to "IEEE Standards for Information Technology—Telecommunications and Information Exchange between Systems"—Part 15.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A millimeter-wave communication system comprising:
    a multi-sector directional antenna to direct millimeter-wave signals within a selected one or more of a plurality of sectors substantially in a horizontal plane; and
    a plurality of millimeter-wave reflectors spaced away from the directional antenna and positioned above obstacles in an indoor area, each of the sectors having one or more of the millimeter-wave reflectors positioned to reflect portions of the millimeter-wave signals to one or more user devices when illuminated by the multi-sector directional antenna,
    wherein a main beam generated by the directional antenna is diverging in the horizontal plane and substantially non-diverging in a vertical plane.

2. The millimeter-wave communication system of claim 1 wherein the indoor area is enclosed by at least a ceiling,
    wherein the directional antenna directs the millimeter-wave signals along above the obstacles substantially in the horizontal plane,
    wherein the main beam generated by the directional antenna is diverging in the horizontal plane and substantially non-diverging in the vertical plane to allow the main beam to remain above the obstacles, and
    wherein the one or more reflectors are positioned on or near the ceiling above user locations to reflect the millimeter-wave signals to the user devices.

3. The millimeter-wave communication system of claim 2 wherein the directional antenna comprises a chip-lens array antenna comprising a millimeter-wave lens to shape the main beam and a chip-array to generate and direct an incident beam of millimeter-wave signals through the millimeter-wave lens for subsequent transmission to the user devices, and
    wherein the millimeter-wave lens has an inner surface and an outer surface with curvatures selected to provide main beam as diverging in the horizontal plane and main beam as substantially non-diverging beam in the vertical plane.

4. The millimeter-wave communication system of claim 3 wherein the chip-array is coupled to control circuitry to steer the incident beam within the lens to direct the millimeter-wave signals among the plurality of reflectors.

5. The millimeter-wave communication system of claim 1 wherein the multi-sector directional antenna comprises a plurality of chip-lens array antennas to generate and to direct the millimeter-wave signals within an associated one of the sectors.

6. The millimeter-wave communication system of claim 5 wherein each of the chip-lens array antennas comprises a millimeter-wave lens to shape the main beam and a chip-array to generate and direct an incident beam of millimeter-wave signals through the millimeter-wave lens for subsequent transmission to the user devices,
    wherein the millimeter-wave lens has an inner surface and an outer surface with curvatures selected to provide main beam as diverging in the horizontal plane and main beam as substantially non-diverging beam in the vertical plane, and
    wherein the chip-array is coupled to control circuitry to steer the incident beam within the lens to direct the millimeter-wave signals among the sectors.

7. The millimeter-wave communication system of claim 1 wherein at least some of the millimeter-wave reflectors are secondary reflectors,
    wherein the system further comprises one or more distributing reflectors positioned on or near a ceiling to reflect portions of the main beam and provide one or more distributed beams, and
    wherein the secondary reflectors are positioned on or near the ceiling within one of the distributed beams to reflect the millimeter-wave signals to the user devices.

8. The millimeter-wave communication system of claim 7 wherein the directional antenna generates a substantially collimated beam substantially parallel to the ceiling,
    wherein the directional antenna directs the substantially collimated beam along a path comprising a series of the distributing reflectors, and
    wherein each successive distributing reflector reflects millimeter-wave signals of the substantially collimated beam that were not reflected by a prior distributing reflector in the series.

9. The millimeter-wave communication system of claim 1 wherein the directional antenna generates a substantially collimated beam above the obstacles in the indoor area,
    wherein at least some of the millimeter-wave reflectors comprise secondary reflectors,
    wherein the communication system further comprises:
    one or more millimeter-wave lenses positioned within the substantially collimated beam to re-focus the substantially collimated beam; and
    one or more distributing reflectors to reflect at least portions of the substantially collimated beam and generate one or more distributed beams,
    wherein the secondary reflectors are positioned within the distributed beams to reflect the millimeter-wave signals for receipt by some of the user devices.

10. A method of communicating comprising:
    generating a main beam that is diverging in a horizontal plane and substantially non-diverging in a vertical plane;
    directing, with a multi-sector directional antenna, within a selected one or more of a plurality of sectors, multicarrier-modulated millimeter-wave signals above obstacles in an indoor area in the horizontal plane for reflection off a plurality of reflectors for subsequent receipt by one or more user devices, the reflectors being spaced away from the directional antenna and being positioned above the obstacles,
    wherein, each of the sectors has one or more of the reflectors positioned therein to reflect portions of the millimeter-wave signals to one or more user devices when illuminated by the multi-sector directional antenna.

11. The method of claim 10 wherein generating comprises:
generating and directing the main beam with a chip-array; and
shaping the main beam with a millimeter-wave lens,
wherein the chip-array directs an incident beam of millimeter-wave signals through the millimeter-wave lens for subsequent transmission to the user devices, and
wherein the millimeter-wave lens has an inner surface and an outer surface with curvatures selected to provide main beam as diverging in the horizontal plane and main beam as substantially non-diverging beam in the vertical plane.

12. The method of claim 10 further comprising steering the incident beam within the millimeter-wave lens to direct the millimeter-wave signals among the plurality of reflectors.

13. The method of claim 10 wherein at least some of the millimeter-wave reflectors are secondary reflectors,
wherein the method further comprises reflecting portions of the main beam off the secondary reflectors to provide one or more distributed beams, and
wherein the secondary reflectors are positioned above the obstacles and within one of the distributed beams to reflect the millimeter-wave signals to the user devices.

14. The method of claim 10 wherein generating comprises generating a substantially collimated beam above the obstacles,
wherein at least some of the millimeter-wave reflectors comprise secondary reflectors,
wherein the method further comprises:
refocusing the substantially collimated beam with one or more millimeter-wave lenses positioned within the substantially collimated beam; and
reflecting at least portions of the substantially collimated beam with one or more distributing reflectors to generate one or more distributed beams,
wherein the secondary reflectors are positioned within the distributed beams to reflect the millimeter-wave signals for receipt by some of the user devices.

* * * * *